United States Patent [19]
Marquardt et al.

[11] 3,832,507
[45] Aug. 27, 1974

[54] SENSOR SWITCH FOR OCCUPANT RESTRAINT SYSTEM WITH SPRING FRACTURE DETECTION MEANS

[75] Inventors: James F. Marquardt, Wauwatesea; Vincent A. Orlando, Greenland, both of Wis.

[73] Assignee: General Motors Corporation, Detroit, Mich.

[22] Filed: June 26, 1973

[21] Appl. No.: 373,684

Related U.S. Application Data
[62] Division of Ser. No. 191,859, Oct. 22, 1971, Pat. No. 3,765,699.

[52] U.S. Cl..... 200/61.45 R, 200/61.48, 200/61.51, 200/166 BB
[51] Int. Cl. ............................. H01h 35/14
[58] Field of Search.......... 200/61.45, 61.53, 153 R, 200/166 BB, DIG. 45; 280/150 AB; 180/91

[56] References Cited
UNITED STATES PATENTS

| | | | |
|---|---|---|---|
| 2,951,130 | 8/1960 | Mason | 200/166 BB |
| 3,073,922 | 1/1963 | Miller | 200/61.48 |
| 3,452,309 | 6/1969 | Wilkes | 200/153 R X |
| 3,567,881 | 3/1971 | Duimstra et al. | 200/61.53 |
| 3,749,863 | 7/1973 | Kaiser | 200/61.48 X |

Primary Examiner—James R. Scott
Attorney, Agent, or Firm—Herbert Furman

[57] ABSTRACT

A vehicle includes a bumper or other portion which experiences a rapid change in velocity upon vehicle impact with an obstacle, an occupant compartment, an inflatable occupant restraint cushion within the compartment, and a source of pressure fluid for inflating the cushion. A sensor primarily responsive to the change in velocity of the bumper or other portion of the vehicle includes a housing of dielectric material having a sector-shaped recess, a spool-shaped mass of electrically conductive material slidable within the recess, and a pair of tension springs of electrically conductive material which are hooked between the mass and the housing to maintain the mass in unactuated position in engagement with the side walls of the recess adjacent the apical end thereof. The sensor is mounted on the bumper or other portion and is subjected to the velocity change thereof upon vehicle impact with an obstacle. The time for the mass to travel to actuated position is comparable within an order of magnitude to the deceleration time period of the sensor whereby movement of the mass to actuated position is responsive to the occurrence of a change in vehicle velocity above a predetermined value. When the mass moves to actuated position, it completes an electrical circuit across a pair of contacts located adjacent the basal end of the recess to initiate release of the pressure fluid to the cushion for inflation thereof. The springs and mass and the spring anchors to the housing are connected across a source of power in a diagnostic circuit so that any fracture of either spring can be detected.

9 Claims, 6 Drawing Figures

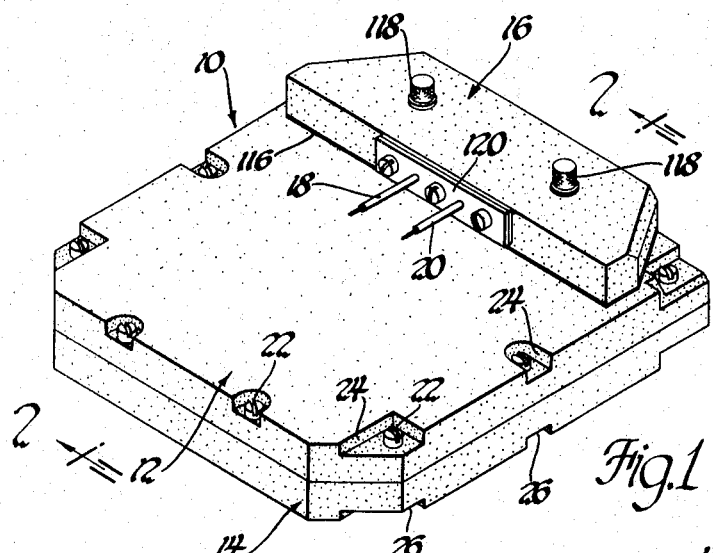
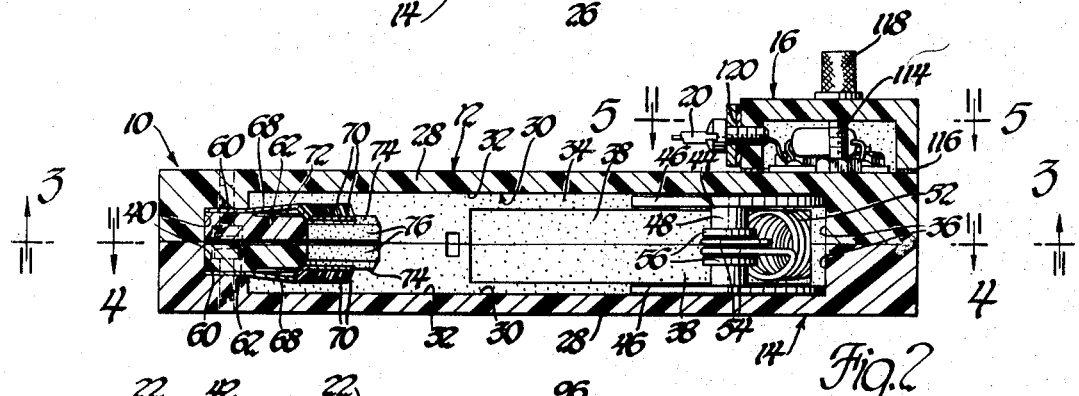
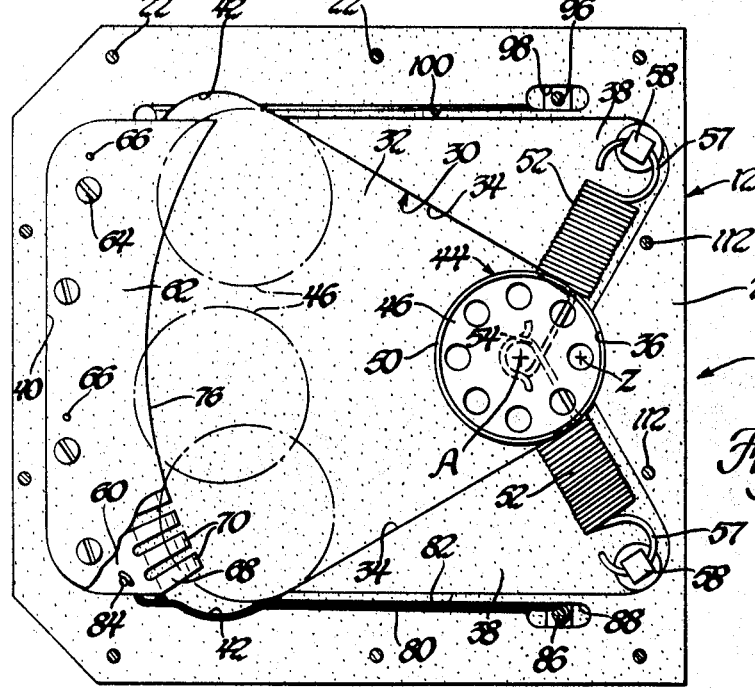

SENSOR SWITCH FOR OCCUPANT RESTRAINT SYSTEM WITH SPRING FRACTURE DETECTION MEANS

This application is a division of Ser. No. 191,859, filed Oct. 22, 1971, now U.S. Pat. No. 3,765,699.

This invention relates generally to occupant restraint systems and more particularly to an occupant restraint system which includes a velocity responsive sensor for detecting the occurrence of a predetermined change in vehicle velocity upon vehicle impact with an obstacle and initiating inflation of an inflatable occupant restraint cushion within the vehicle occupant compartment prior to the time that any significant deceleration of such compartment due to the impact occurs.

It is well known to provide occupant restraint systems which include an inflatable occupant restraint cushion within an occupant compartment of a vehicle and which is inflated from a pressure fluid source upon impact of the vehicle with an obstacle. The impact may be conventionally detected by an electrical contact switch mounted on the bumper and closed by the impact, various devices actuated by a predetermined distance of movement of the bumper or the mounting structure for the bumper, or one or more acceleration responsive sensors mounted on vehicle body structure, such as the firewall or toe pan, and actuated when the sensor receives an acceleration pulse of predetermined amplitude and time from such structure. Such sensors receive the pulses after the pulses have traveled through the body structure intervening between the point of impact and the sensor. If the pulse is not of the required amplitude and time when it reaches the sensor, the sensor is not actuated. Likewise, there is a time delay or interval between the time of initial impact of the vehicle with an obstacle and the time at which the pulse reaches the sensor. Such time delay varies with the particular body structure on which the sensor is mounted, the intervening body structure, the presence of energy absorbing structure between the bumper and the intervening body structure, as well as other factors. The sensors must therefore be calibrated in accordance with the particular vehicle on which they are to be used, the area of such vehicle on which they are to be mounted, and damping of any impact generated pulses between the impact point of origin and the sensor.

Acceleration responsive sensors may include a mass which is constrained against movement from an unactuated to an actuated position by springs or magnets which apply a preload force to the mass. Generally the preload force is quite high in order that the sensor be calibrated and that the mass not inadvertently move to an actuated position under normal driving conditions or under certain abnormal driving conditions which do not involve impact of the vehicle with an obstacle or do involve such an impact but at a level at which it is not necessary to inflate the cushion. The distance of movement of the mass to actuated position is usually relatively short, such as one-half inch, and the preload force applied to the mass is quite high.

The sensor of the occupant restraint system of this invention is primarily velocity responsive and includes a housing having a generally sector-shaped recess. A mass is slidable within the recess from an unactuated position adjacent the apical end thereof to an actuated position adjacent the basal end thereof. In the actuated position, the mass completes an electrical circuit across a pair of spaced contacts which initiates inflation of the cushion from the source of pressure fluid. The mass is normally constrained against movement to actuated position by a pair of tension springs which are connected between the mass and the housing and exert a light preload force on the mass. The springs provide redundancy in the event of fracture of one spring and also permit a check as to the continuity of the springs.

The sensor is mounted on the bumper or any other portion of the vehicle which experiences a rapid change in velocity or may be mounted remote from the bumper or such portion of the vehicle and connected thereto so as to be simultaneously subjected to any changes in velocity experienced thereby.

In front end impacts, the bumper of the vehicle is ordinarily the first part of the vehicle which contacts the obstacle and likewise the first part of the vehicle which comes to a complete rest while the remainder of the vehicle is still decelerating. Actual tests have shown that an interval of 3 to 8 ms occurs between the time of initial bumper contact with an obstacle and the time that movement of the bumper ceases, in an impact of a 28 to 30 mph barrier equivalent. Thus, substantially the total change in velocity of the bumper occurs prior to the total change in velocity of the occupant compactment and prior to the onset of any significant deceleration of the occupant compartment. The sensor is subjected to this same total velocity change simultaneously with the bumper and initiates inflation of the cushion within the occupant compartment prior to any significant deceleration of the compartment when the sensor detects the occurrence of a change in vehicle velocity above a predetermined value.

The spring and mass of the sensor has a period of natural frequency which is comparable to or greater than the deceleration time period of the bumper or other portion of the vehicle on which the sensor is mounted. The period of natural frequency is set in accordance with the desired change in velocity and the time period of such change which must occur before the sensor initiates inflation of the cushion. The movement of the mass to actuated position is therefore primarily responsive to a change in velocity of the portion of the vehicle on which the sensor is mounted occurring within a certain time period. It is not due primarily to the receipt by the sensor of an acceleration pulse generated by impact. While an instantaneous change in velocity of any portion of the vehicle is unobtainable, in other words, it is impossible to instantaneously stop any portion of the vehicle upon impact with an obstacle, the change in velocity of the bumper or other portion of the vehicle on which the sensor is mounted occurs so rapidly that the actuation of the sensor is closely related to the change in velocity of the sensor and to a minor extent, to the deceleration of the sensor.

Since the occupant restraint system of this invention initiates inflation of the cushion when a predetermined change in velocity of a portion of the vehicle occurs, the cushion is inflated in sufficient time for use by an occupant prior to the onset of any significant deceleration of the passenger compartment or of such occupant. The sensor is relatively insensitive to the body structure of the particular vehicle and the response time is relatively fast since there is no time delay or interval between any generation of an acceleration pulse and receipt of such pulse by the sensor.

It is, therefore, the primary object of this invention to provide an occupant restraint system wherein inflation of an occupant restraint cushion within an occupant compartment by a pressure fluid source is controlled by a sensor which experiences the total velocity change of the vehicle upon impact in a period of time which is short comparable to the time for any substantial portion of the deceleration pulse from the impact reaching the occupant compartment whereby the sensor quickly receives the information contained in the total deceleration pulse and can make a fast and accurate prediction of the severity of the impact and the necessity of inflating the cushion, the sensor including a mass movable to an actuated position and having a period of natural frequency which is comparable to or longer than such time period. Another object of this invention is to provide a sensor having a mass constrained against movement from an unactuated position to an actuated position by a pair of springs which provide redundancy. A further object of this invention is to provide a sensor having a mass constrained against movement from an unactuated position to an actuated position by a pair of springs, the springs and mass being of electrically conductive material and completing a circuit across a source of power in the unactuated position of the mass to provide a check of spring continuity. Yet another object of this invention is to provide a sensor which includes a mass movable from an unactuated position to an actuated position wherein the mass completes a circuit across a pair of spaced contacts, the mass being constrained against such movement by a pair of springs which are of electrically conductive material and complete a second circuit with the mass across the source of power in the unactuated position thereof. Yet a further object of this invention is to provide a sensor which includes a generally spool-shaped mass movable from an unactuated position to an actuated position wherein the end plates of the mass slidably engage respective contacts to complete a circuit for initiating inflation of an occupant restraint cushion, the engagement of the axle of the mass with stop means intermediate the contacts limiting the wiping engagement of the end plates with the contacts.

These and other objects of the invention will be readily apparent from the following specification and drawings wherein:

FIG. 1 is a perspective view of the velocity sensor included in the occupant restraint system of this invention;

FIG. 2 is an enlarged sectional view taken generally along the plane indicated by line 2—2 of FIG. 1;

FIG. 3 is a view taken generally along the plane indicated by line 3—3 of FIG. 2;

Figure 4:
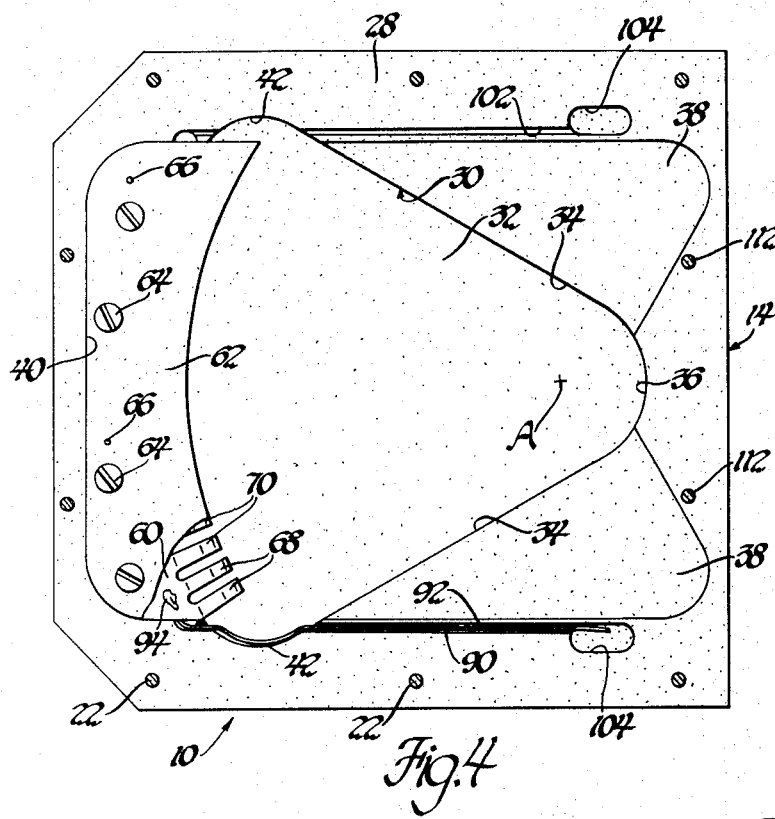
FIG. 4 is a view taken generally along the plane indicated by line 4—4 of FIG. 2.

Referring now to FIG. 1 of the drawings, a velocity sensor designated generally 10 includes upper and lower housing assemblies 12 and 14 which house the mass, the springs which constrain the mass against movement to actuated position, and the contacts closed by the mass upon movement to actuated position, as will be further described.

A cover 16 is secured to the upper housing assembly 12 and encloses the contact posts which connect the sensor to the diagnostic and actuating circuit by means of shielded cables 18 and 20, the former of which is connected to a source of power, such as the vehicle battery.

As shown in FIG. 1, the housing assemblies 12 and 14 are secured to each other by means of a number of bolts 22. The bolt heads are contained within recesses 24 in the outer surface of the upper housing assembly 12 and the nuts, not shown, are contained within like recesses 26 in the outer surface of the lower housing assembly 14.

The housing assemblies 12 and 14 are generally alike and accordingly like numerals will be used for like parts. Referring now particularly to FIGS. 2, 3 and 4 of the drawings, each housing assembly includes a molded plastic housing 28 which is provided with a generally sector-shaped recess 30, the base wall 32 of which is planar and the side walls 34 of which are located at an included angle of 60°. The proximal ends of the side walls are joined by arcuate wall sections 36 generated about an axis A. Generally triangularly shaped recesses 38, of lesser depth than a respective recess 30, open to such recess through the side walls 38 thereof. A generally rectangularly shaped recess 40 opens to each recess 30 at the distal ends of the side walls 34 thereof. Each recess 40 is joined to a respective pair of side walls 34 by arcuate walls 42. The recesses 32, 38 and 40 open to each other and have their respective base walls located parallel to each other and their side walls aligned with each other. The opposed recesses 32 provide a mass mounting recess; the opposed recesses 38 provide spring receiving recesses, one to each side of the mass mounting recess; and the recesses 40 provide a contact mounting recess, as will be further described.

A mass 44, FIGS. 2 and 3, of generally spool shape includes upper and lower end plates 46 joined by a spindle or axle 48. Each end plate may include a recessed outer wall which is bounded by an axially extending lip or flange 50 slidably engaging a respective planar base wall 32 of a respective recess 30. The flanges 50 are spaced apart a distance slightly less than the distance between walls 32 and provide for minimum frictional contact between the mass 44 and the walls 32 as the mass moves relative to these walls within the recesses 30 from its unactuated position, as shown in full lines, to its actuated position, as shown in dash lines. The recessed outer walls of the end plates are further apertured, as shown, to adjust the weight of the mass and obtain calibration of the sensor, as will be explained.

When the mass is in unactuated position as shown in FIGS. 2 and 3, its axis is colinear with axis A, and the end plates 46 thereof seat against respective wall sections 36 under the action of a pair of like tension springs 52, each received in a respective pair of recesses 38. Each spring has one return bent end 54 hooked to the axle 48 intermediate a pair of axially spaced radial ribs 56, FIG. 2, to position the springs 52 with their axes normal to axis A and limit any movement of the hooked ends 54 thereof relative to the axle. The other ends 57 of the springs are respectively hooked to like contact posts 58 which have a threaded shank extending upwardly of housing assembly 12 through suitable apertures in the base walls of recesses 38 for a purpose to be described. The axes of the springs 52 intersect at axis A and are located in planes which intersect at axis A and pass through the points of tangency of the end plates 46 with the side walls 34. Such planes also pass through the axes of the contact posts 58 so that the axis of the line of force of each spring is applied to the mass normal to and through the axial center thereof.

As shown in FIG. 2, a spring contact 60 seats on the base wall of each recess 40 and is located by a respective retainer 62 which is bolted at 64 through the spring contact to a respective housing assembly. One or more locating pins 66 are received in bores drilled after adjustment to fix the retainers and contacts. Each contact 60 incudes a plurality of spaced spring fingers 68 having integral respective ends 70 bent at an included angle of 130° to the plane of the contact and terminating in an arc generated about an axis Z. Each retainer 62 includes a circular recess 72 underlying the fingers of a respective contact and terminating in an arcuate chamfer 74 joining such recess to an arcuate end wall 76 of the retainer which is generated about axis Z to result in equal sensitivity for any input direction within the side walls 34. The chamfers are spaced a lesser radial distance from the axis Z than the ends 70 such that the ends 70 slidably engage the chamber 74 of a respective retainer to force the fingers 68 out of their normal planar relationship to the body of the contact as shown in FIG. 2 and prevent contact bounce when the mass engages the fingers. The spring fingers 68 are thus cantilevered over a respective recess 72 and the junctures between the fingers and their respective ends lie in planes spaced apart a distance slightly greater than the distance between the inner walls of the end plates 46 of mass 44. Thus, when the mass moves to actuated position, as indicated in dash lines in FIG. 3, the inner walls of the end plates 46 wipe across a plurality of fingers of each contact to complete an actuation circuit, as will be described. The wiped fingers are deflected toward a respective recess 62 as the ends 70 of such fingers slide inwardly along a respective chamfer 74.

As shown in FIG. 3, a wire 80 fits within an integral groove 82 in the upper housing assembly 12 and has one end thereof soldered at 84 to the contact 60 of this housing assembly. The other end of the wire is electrically connected to a contact post 86 which includes a square body received within a rectangular recess 88 of the housing assembly and a threaded shank extending upwardly through the housing assembly as will be described. Likewise, as shown in FIG. 4, a wire 90 fits within a groove 92 of the housing assembly 14 and has one end thereof soldered at 94 to the contact 60 of this housing assembly. The other end of the wire 90 is electrically connected to a contact post 96, FIG. 3, of assembly 12 which is received in a recess 98 and extends upwardly through the housing assembly 12 the same as the post 86. With reference to FIGS. 3 and 4, it will be noted that housing assemblies 12 and 14 include respective recesses 100 and 102 opposite their respective recesses 82 and 92 to respectively receive the wires 90 and 80 when the housing assemblies are assembled as shown in FIG. 1. Likewise, housing assembly 14 includes rectangular recesses 104 to receive posts 86 and 96.

Figure 5:
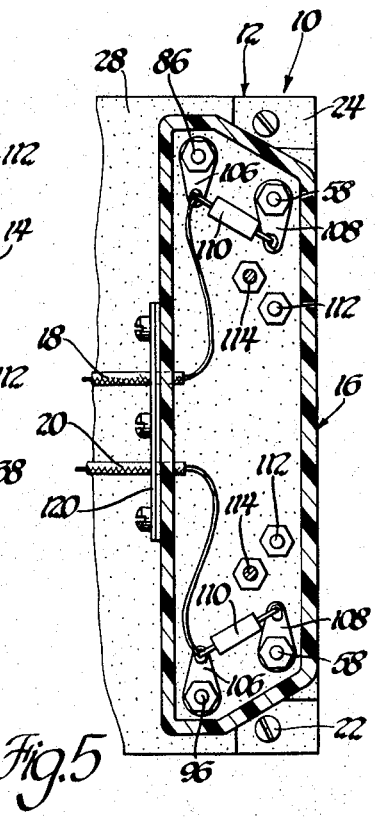
FIG. 5 is a view taken generally along the plane indicated by line 5—5 of FIG. 2.

Referring now to FIG. 5 of the drawings, a contact lug 106 is received on the threaded shank of each post 86 and 96 and held in place by a nut threaded on the shank. A like lug 108 is received on the threaded shank of each contact post 58 and similarly held in place. A resistor 110 is connected across each pair of lugs 106 and 108. One resistor is connected to the wire of the shielded cable 18 and the other to the shielded cable 20. In the specific embodiment shown, the resistors 110 are 1.5 ohm resistors.

Also extending upwardly through aligned apertures in housing assemblies 12 and 14 are the threaded shanks of bolts 112 which additionally secure the housing assemblies together, and the threaded shanks of bolts 114 which have their heads located in recesses in the base walls of the recesses 38 of the housing assembly 12 above springs 52. Nuts threaded on bolts 112 and 114 engage the upper surface of assembly 12. The cover 16 is sealed at 116, FIG. 2, to the upper surface of the housing assembly 12 and includes suitable apertures which receive the shanks of bolts 114 therethrough. Cap nuts 118, FIG. 1, threaded on the shanks of bolts 114 additionally secure the cover 16 in place.

The cables 18 and 20 extend inwardly of the cover 16 through suitable openings in a side wall thereof with these openings being closed by a gasket and plate assembly 120 which is bolted to the side wall.

From the foregoing description, it can be seen that when the mass 44 is in unactuated position, shown in FIG. 3, a series current path is established from the shielded cable 18 to the lug 106, through the resistor 110 to the lug 108, and then through the spring 52 through the mass 46 to the other spring 52 and thence to the other lug 108. The path then continues through the other resistor 110 to the other lug 106 and then to the other shielded cable 20.

When the mass 46 is in actuated position as shown in dash lines in FIG. 3, the current path is from the cable 18 to the contact post 86 through the wire 80 to the one contact 60 connected thereto. The path continues through the mass 44 to the other contact 60, through the wire 90 to the other contact post 96 and thence to the shielded cable 20.

Figure 6:
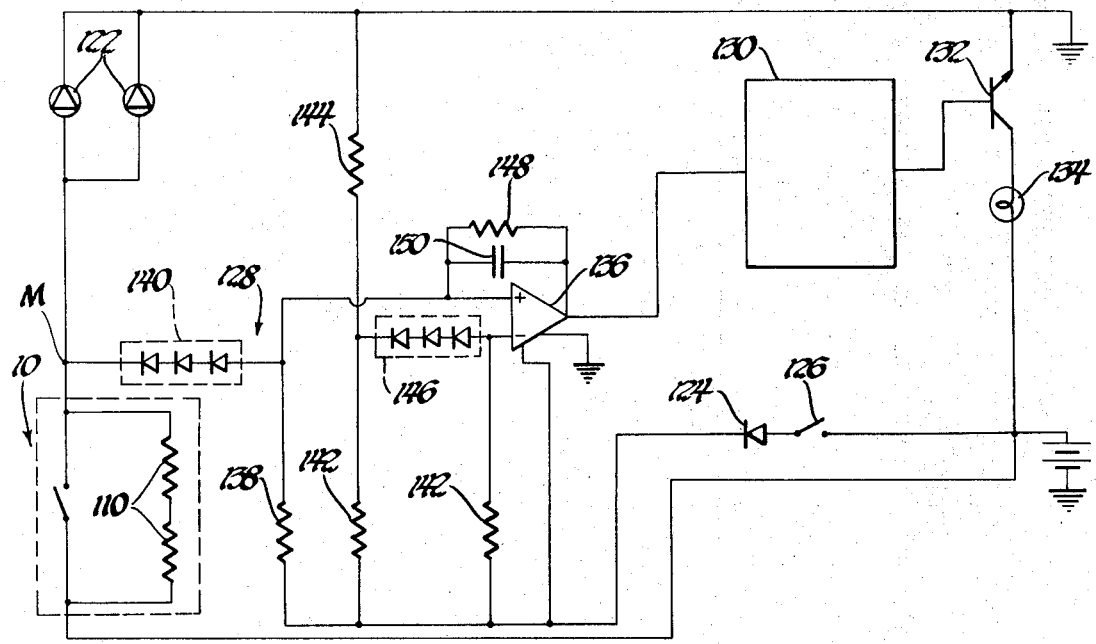
FIG. 6 is a schematic of a diagnostic and actuating circuit.

Referring now to FIG. 6, the sensor 10 is shown as serially connected with redundant parallel connected detonators or squibs 122 across a source of current which is preferably the vehicle battery. The current flow through the mass 44, springs 52, and resistors 110 is insufficient to fire the detonators or squibs 122. However, upon movement of the mass 44 to actuated position, the resistors 110 are electrically shorted and the detonators or squibs 122 are fired. As is well known, air cushion restraint systems conventionally include a pressure vessel containing fluid under pressure and connected to a manifold and diffuser across a rupturable diaphragm. The manifold and diffuser inflate the cushion. The diaphragm is ruptured by redundant detonators or squibs such as the detonators or squibs 122. Such systems may also be of the air-augmented type and include a chemical propellant ignited by an igniter with the output of the gas generator being closed by a pressure rupturable diaphragm or a detonator rupturable diaphragm. In such instance, one or more of the detonators or squibs 122 may be replaced by the igniter or the igniter may be added in parallel.

Under normal conditions a nominal voltage appears at a monitoring junction designated M. Deviations in the voltage at the monitoring junction M indicative of a malfunction in the sensor 10, the detonators or squibs 122, and the squib cabling are detected by monitoring circuitry generally designated 128 which is connected to the battery. For example, if the detonators or squibs 122, or squib cables, open circuit, the voltage at the monitoring circuit M through a diode 124 and an ignition switch 126 will rise toward battery voltage. On the other hand, a shorted squib or squib cable or a broken spring will cause the voltage at the monitoring junction M to drop toward ground potential. The monitoring circuitry 128 includes an upper and lower level detector 130 which provides base drive current to a lamp driver transistor 132 when the voltage at the monitoring junction rises above or drops below the nominal voltage by a predetermined amount. The transistor 132 when rendered conductive energizes a lamp 134 to inform the vehicle operator of a malfunction in the actuation circuit. The voltage at the junction M is amplified and applied to the level detector 130 by a high gain operational amplifier 136. Since only a positive voltage supply is available on the vehicle, the noninverting and inverting inputs of the amplifier 136 are biased to a positive potential of approximately +2 v.d.c. by the biasing network shown. The biasing network includes a resistor 138 and a string of diodes 140 respectively connecting the battery and the monitoring junction M to the non-inverting input of the amplifier 136, and the voltage dividing resistors 142, 144 and the string of diodes 146 connecting the inverting input of the amplifier 136 to the battery. The amplifier 136 has a nominal output voltage of 6 volts DC with a ±3 v.d.c. swing as the voltage at the noninverting input varies ±2 mv due to a malfunction in the actuation circuit. Parallel connected resistor 148 and capacitor 150 interconnect the output of the amplifier 136 with the noninverting input to eliminate any erroneous output of the amplifier due to noise or transients. When the input to the level detector 130 varies 6 ±3 v.d.c., the output of the detector biases transistor 132 to conduction and illuminates the lamp 134 to indicate a malfunction in the actuation circuit.

As has been previously stated, the sensor is mounted on a portion of the vehicle which comes to rest in a time period which is short compared to the decelerating time of the occupant compartment. In such a location, it has been shown that the amplitude of the deceleration pulse is not a reliable indication of crash severity—crash severity being a measure of injury—to the vehicle occupant. It is only by making the sensor responsive primarily to velocity that discrimination of crash intensity can be made as will be demonstrated later. The velocity sensitive nature of this sensor is based on the concept of a simple mass supported on a simple spring. If an impulse, an instantaneous change in velocity, $V_o$, is imparted to the mass, the maximum excursion of the mass, $S_o$, and maximum acceleration of the mass, $A_o$, are given by the well-known relationships describing a steady state, undamped oscillation:

$$V_o = S_o W$$

$$A = V_o W$$

The value of W is given by the well-known relationship $W = \sqrt{(K/M)}$, where $K$ is the elastic constant of the spring and M is the mass supported on the spring (and in this case, it includes not only the supported mass, but also the total mass of the restraining springs). The selection of W is basic to this invention as will be shown by a table of values. Impulses which are comparable to or shorter than the natural period of the spring mass arrangement introduce only that amount of error in the measurement of true velocity which is desirable and necessary in a sensor. If the sensor responded perfectly to a change in velocity, it would actuate whenever a predetermined change in velocity of the vehicle occurred, such as that due to normal vehicle braking. This is clearly undesirable. It can be further shown that for a "hard" crash, such as a crash into a rigid barrier, actuation should occur at a lower speed and in a faster time than in a "soft" crash, such as into the side of another vehicle. It is a feature of this invention that by a proper combination of resonant frequency, mass distance to the contacts, and location and orientation of the sensor, the sensor can be designed to actuate under different crash conditions in different times and different velocities so that in each case it can subject the occupant of the vehicle to an impact severity which is approximately equal in spite of the large variations in impact conditions.

A quantitative measure of crash severity can be assigned by describing the shape and time duration of the acceleration pulse for a given velocity change. Experience has shown that a "hard" or barrier crash is often represented by a damped sine wave of a period of oscillation, $\tau$, of 4 to 8 milliseconds. A "soft" crash can be represented by a haversine. Experience has shown that most crashes have a deceleration pulse that lies somewhere between the damped sine wave and a haversine. The calculated values of threshold velocity and actuation times of a particular sensor experiencing these two inputs for various input time constants, $\tau$, are presented in the following table which shows the firing times for various pulse periods for a sensor calibrated to fire at a change in velocity of 12 mph. The firing times for this same sensor at frontal impact velocities of 30 mph are also shown.

12 mph Sensor Response

| Impact Velocity | Pulse Period (ms) $\tau$ | Input Acceleration Pulse Characteristics | | | | | |
|---|---|---|---|---|---|---|---|
| | | Haversine | | | Damped Sine | | |
| | | velocity fire mph | fire time ms | peak "G" $A_o$ | velocity fire mph | fire time ms | peak "G" $A_o$ |
| Threshold velocity (nominally 12 mph) | 2 | 12.2 | 16.8 | 560 | 12.1 | 16.6 | 1315 |
| | 6 | 12.5 | 19.6 | 189 | 12.1 | 16.5 | 438 |
| | 8 | 12.8 | 19.4 | 145 | 12.1 | 16.1 | 330 |
| | 16 | 13.2 | 24.8 | 75 | 11.7 | 14.5 | 158 |
| 30 mph Frontal Impact Velocity | 2 | 30 | 5.5 | 1367 | 30 | 4.6 | 3261 |
| | 6 | 30 | 7.6 | 456 | 30 | 4.5 | 1087 |
| | 8 | 30 | 8.6 | 342 | 30 | 4.8 | 815 |
| | 16 | 30 | 12.8 | 171 | 30 | 6.7 | 408 |

The parameters of the sensor on which the table is based are:

$M_T$ (mass weight) = 26.8 grams
$K = 0.75$ lbs/in
$X$ (distance of mass to travel to contacts) = 2.3 in.
$F_o$ (preload force) = 0.4 lbs
$W = 94$ radians/second
$\tau = 67$ ms The area under all acceleration curves is velocity by definition. The interdependence of $A_o$, $\tau$ and V for the quantities in the table are given by the following equations. Equation for a haversine pulse:

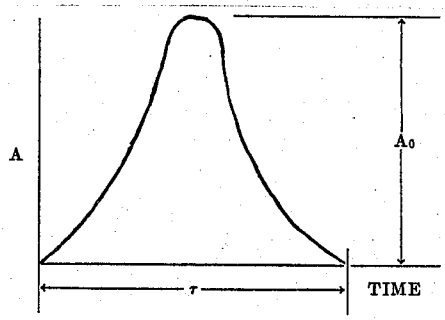

$$A = \frac{V}{386T}\left(1 - \cos\frac{2\pi}{\tau}t\right)$$

$A$ = acceleration in Gs $V$ = velocity in inches/sec $\tau$ and $t$ in seconds

Equation for a damped sine wave:

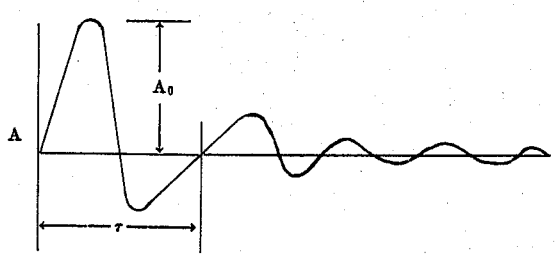

$$A = 1.69 \times 10^{-1.26\frac{t}{\tau}}\frac{-2V}{\tau}\epsilon \times \sin\frac{2\pi}{\tau}t$$

It is instructive to note that certain low speed crashes have higher values of acceleration than some high speed crashes. Since the sensor has no way of knowing the kind of crash that it will be involved in, its response must not be acceleration dependent, but rather primarily velocity dependent as already stated. For example with a damped sine wave input having a time constant, $\tau$, of 2 ms, the threshold value of the sensor (the value below which the sensor will not actuate) is 12.1 mph and the peak G value experienced by the sensor is 1315. The time for the sensor to fire after initiation of the pulse is 16.6 ms. For a 30 mph damped sine input with a $\tau$ of 16 ms, the G level is only 408, but the firing time is much faster, 6.7 ms. Clearly, the sensor is primarily responsive to velocity.

The $A_o$ values in the table may be compared with similar values of an acceleration responsive sensor. In such a sensor, $A_o$ would be approximately equal to 15 Gs. While both sensors use what may be termed spring mass systems, it can be seen that the spring mass system of the subject sensor is relatively immune to acceleration pulses and is responsive only to a predetermined change in vehicle velocity in a predetermined time period while the acceleration responsive sensor is responsive only to acceleration pulses of much lower magnitude and is not responsive to changes in vehicle velocity.

Since the sensor 10 does not depend upon any deceleration pulse reaching it through intervening body structure, it can accurately detect the velocity of the vehicle immediately prior to the impact. Any resonance or noise caused by the impact has no effect on the sensor since it does not depend on a deceleration pulse reaching it through any intervening body structure. The sensor 10 can receive impact information and actuate the cushion before the occupant or the occupant compartment has experienced any significant deceleration and before an acceleration responsive sensor could receive the same information and actuate the cushion.

To summarize, the sensor 10 of the system of this invention includes a mass having a period of natural frequency which is comparable to or larger than the deceleration time period of the bumper or other portion of the vehicle on which the sensor is mounted and which is subjected to impact forces so as to experience a total change in velocity before the occupant compartment experiences such total change or experiences any significant deceleration. While the sensor 10 may be mounted on the bumper or other portion of the vehicle, it may also be mounted remote from the bumper or portion of the vehicle and rigidly connected thereto, such as by stiff rods, such that the sensor 10 experiences the same deceleration within the same time period as the bumper or other portion of the vehicle.

The use of two springs 52 constraining the mass 44 gives the sensor 10 advantages over those sensors which use only one spring. If a spring 52 does fracture, the sensitivity of the sensor 10 drops by the reciprocal of the square root of 2 or drops approximately 30 percent.

It should be noted that the sensor 10 does not require the use of two springs since it will function equally as well with one spring.

It should also be noted that although the sensor 10 shown herein has directional sensitivity in that it is responsive to pulses received within the included angle defined by walls 34, the sensor 10 can be responsive only to pulses which are directed generally coaxial of a direction of movement of a mass which is constrained during its movement by a rod or tube. The rod or tube constrains the mass for movement along an axis and the pulse must be generally coaxial with such axis in order for the sensor to be actuated.

While a specific example of a sensor has been disclosed herein, one set to fire at a change in velocity of 12 mph within a certain time period, the sensor 10, of course, can be set to fire at other changes in velocities within similar time periods. For example, a sensor which would fire at a change in velocity of 30 mph would have a mass weight of 18.9 grams, $K = 3.45$ lbs per inch, and a preload of 1.13 lbs.

The sensor 10 disclosed herein dissipates the kinetic energy of the mass prior to the crash by converting this energy to the potential energy of a stretched spring and utilizing the stretch of the spring as a measure of impact severity. However, it should be noted that other force-producing mechanisms, such as magnetic attraction, controlled friction, nonlinear springs, and perhaps suitably biased damping means, which remove motion or energy of the mass over a period of time comparable to or longer than the duration of the pulse of the impact can be used in a sensor according to this invention by having the sensor provide a signal based on the distance the mass thereof travels while dissipating its energy.

Thus, this invention provides an improved occupant restraint system.

We claim:

1. A sensor comprising, in combination, a housing including a mass receiving recess, a mass slidably received in the recess for movement between unactuated and actuated positions, and a pair of springs respectively anchored at one end to the housing and secured at their other ends to the mass to locate the mass in unactuated position, the springs and mass being of electrically conductive material and closing a monitor circuit between the spring anchors to the housing across a source of power to test the continuity of the springs.

2. A sensor comprising, in combination, a housing including a mass receiving recess having spaced generally parallel planar walls, a mass received in the recess and including spaced generally parallel planar walls slidably engaging respective walls of the recess for movement between unactuated and actuated positions, and a pair of springs, each having one end respectively anchored to the housing and the other end secured to the mass intermediate the walls thereof to locate the mass in unactuated position, the springs and mass being of electrically conductive material and closing a monitor circuit between the spring anchors to the housing across a source of power to test the continuity of the springs.

3. A sensor comprising, in combination, a housing including a mass receiving recess having spaced parallel planar walls, a generally spool-shaped mass received in the recess with the end plates thereof slidably engaging respective planar walls of the housing for movement of the mass between unactuated and actuated positions, and a pair of tension springs, each having one end respectively anchored to the housing to one side of the recess and the other end secured to the axle of the mass to hold the mass in unactuated position against movement to actuated position, the springs and mass being of electrically conductive material and closing a monitor circuit between the spring anchors to the housing across a source of power to test the continuity of the springs.

4. A sensor comprising, in combination, a housing including a mass receiving recess of generally sector shape having spaced parallel planar base walls and a sector-shaped side wall joining the base walls to define the recess therewith, a generally spool-shaped mass having the end plates thereof slidably engaging respective base walls of the recess for movement between unactuated and actuated positions, and a pair of tension springs, each having one end thereof respectively anchored to the housing adjacent the apical end of the recess and the other end thereof secured to the axle of the mass intermediate the end plates thereof to exert a preload force on the mass holding the mass in the unactuated position with the end plates thereof in engagement with the side wall of the recess adjacent the apical end thereof, the springs and mass being of electrically conductive material and closing a monitor circuit between the spring anchors across a source of power to test the continuity of the springs.

5. A sensor comprising, in combination, a housing including a generally sector-shaped mass receiving recess having generally parallel planar spaced base walls joined by side walls defining an included angle and an arcuate end wall at the proximal ends of the side walls, a generally spool-shaped mass received within the recess and including circular end plates slidably engaging the base walls of the recess for movement of the mass between an unactuated position wherein the end plates tangentially engage the side walls and engage the end wall, and an actuated position adjacent the distal ends of the side walls, a pair of tension springs, each having one end thereof respectively anchored to the housing adjacent the proximal end wall of the recess and the other ends thereof secured to the axle of the mass intermediate the end plates to hold the mass in unactuated position, the springs and mass being of electrically conductive material and closing a first circuit across a source of power between the spring anchors to the housing, the lines of force of the springs lying in planes intersecting at the mass axis and passing through the points of tangency of the mass end plates with the recess side walls, and spaced contact means adjacent the distal ends of the side walls engageable by the end plates of the mass upon movement of the mass to actuated position to close a second circuit across a source of power between the contact means.

6. The combination recited in claim 3 wherein the end plates of the mass include recessed outer surfaces bounded by an axially extending lip slidably engaging respective planar walls to thereby reduce friction between the end plates and the walls to a minimum.

7. The combination recited in claim 4 including spaced deflectable contact means adjacent the basal end of the recess slidably engageable by the end plates upon movement of the mass to actuated position and deflectable relative to each other upon such engagement, the contact means and mass closing a second circuit across the source of power.

8. The combination recited in claim 5 wherein the contact means are cantilever mounted on the housing and are deflectable relative to each other upon engagement with the end plates of the mass.

9. The combination recited in claim 5 wherein the contact means each include at least one cantilever spring finger having an integral angular terminal, and means on the housing slidably engageable with the angular terminals to deflect the spring fingers relative to each other to a position in the path of movement of the mass for slidable engagement with a respective end plate.

* * * * *